United States Patent
Naito

(10) Patent No.: US 9,149,765 B2
(45) Date of Patent: Oct. 6, 2015

(54) SYSTEM FOR REMOVAL OF IMPURITIES BY COMPRESSOR

(71) Applicant: IHI Corporation, Koto-ku (JP)

(72) Inventor: Toshiyuki Naito, Koto-ku (JP)

(73) Assignee: IHI Corporation, Koto-ku (JP)

( * ) Notice: Subject to any disclaimer, the term of this patent is extended or adjusted under 35 U.S.C. 154(b) by 0 days.

(21) Appl. No.: 14/662,446

(22) Filed: Mar. 19, 2015

(65) Prior Publication Data

US 2015/0190751 A1 Jul. 9, 2015

Related U.S. Application Data

(63) Continuation of application No. PCT/JP2013/005973, filed on Oct. 8, 2013.

(30) Foreign Application Priority Data

Oct. 24, 2012 (JP) ................. 2012-234263

(51) Int. Cl.
*B01D 53/00* (2006.01)
*F25J 1/00* (2006.01)
*B01D 53/75* (2006.01)
*B01D 53/34* (2006.01)

(52) U.S. Cl.
CPC .............. *B01D 53/75* (2013.01); *B01D 53/002* (2013.01); *B01D 53/346* (2013.01); *F25J 1/0027* (2013.01)

(58) Field of Classification Search
CPC .... B01D 53/002; B01D 53/75; B01D 53/346; F25J 1/0027
USPC .............................. 422/168, 169; 62/606, 617
See application file for complete search history.

(56) References Cited

U.S. PATENT DOCUMENTS 9,011,808 B2 *  4/2015  Schodel et al. ................ 423/220
2008/0184880 A1  8/2008  Fan et al.
(Continued)

FOREIGN PATENT DOCUMENTS

| JP | 2010-507773 A | 3/2010 |
| JP | 2010-172878 A | 8/2010 |
| JP | 2012-143699 A | 8/2012 |
| WO | WO 2012/107953 A1 | 8/2012 |

OTHER PUBLICATIONS

U.S. Appl. No. 14/663,520, filed Mar. 20, 2015, Naito.
(Continued)

*Primary Examiner* — Jill Warden
*Assistant Examiner* — Joye L Woodard
(74) *Attorney, Agent, or Firm* — Oblon, McClelland, Maier & Neustadt, L.L.P.

(57) ABSTRACT

Provided are impurity separators which have compressors for supplying exhaust gas comprising carbon dioxide from oxy-fuel combustor to target pressure stepwisely before supply to carbon dioxide liquefier and have aftercoolers for cooling exhaust gas compressed by the compressors stepwisely to target pressure, water condensed by cooling being discharged as drain; alkaline agent supply unit which supplies alkaline agent to upstream side of aftercooler in last impurity separator to discharge drain containing alkaline agent having removed impurities in exhaust gas from aftercooler in last impurity separator; and circulation line for supplying of drain from aftercooler in last impurity separator to upstream side of aftercooler in first impurity separator.

5 Claims, 3 Drawing Sheets

(56) References Cited

U.S. PATENT DOCUMENTS

2012/0009107 A1* 1/2012 Petrocelli et al. ............. 423/235
2013/0319040 A1 12/2013 Naito

OTHER PUBLICATIONS

International Search Report Issued on Jan. 28, 2014 for PCT/JP2013/005973 filed on Oct. 8, 2013 (English Language).

* cited by examiner

SYSTEM FOR REMOVAL OF IMPURITIES BY COMPRESSOR

TECHNICAL FIELD

The present invention relates to a compressor-based impurity removal system and specifically relates to a compressor-based impurity removal system adapted to remove impurities in exhaust gas from an oxyfuel combustor, using simple equipment.

BACKGROUND ART

Recently, an oxyfuel combustor has been studied as one of techniques for treating carbon dioxide ($CO_2$) which is said to be one of factors for global warming; and attention has been attracted to, for example, a coal-fired boiler for oxyfuel combustion of pulverized coal. It has been conceived in such coal-fired boiler that oxygen is used as an oxidizing agent in lieu of air to produce combustion exhaust gas mainly composed of carbon dioxide ($CO_2$) and such exhaust gas with high $CO_2$ concentration is compressed and cooled to obtain liquefied carbon dioxide for disposal. It has been conceived as one of ways of disposal that the liquefied carbon dioxide is transported by carrying means such as a carrying vessel or a pipe line to a destination where it is stored in the ground.

Such exhaust-gas treatment system for a coal-fired boiler for oxyfuel combustion is disclosed in Patent Literature 1.

As shown in Patent Literature 1, the exhaust gas from the coal-fired boiler for oxyfuel combustion is known to contain not only carbon dioxide ($CO_2$) but also impurities derived from coal feedstock such as nitrogen oxides ($NO_x$), sulfur oxides ($SO_x$), hydrargyrum (Hg), hydrogen chloride (HCl) and dust. Such impurities require to be removed.

Among the above-mentioned impurities, sulfur oxides ($SO_x$) may be contacted with and dissolved in water into sulfuric acid ($H_2SO_4$) and hydrogen chloride (HCl) may be dissolved in water into hydrochloric acid, so that such water-soluble sulfur oxide and hydrogen chloride may be disunited through contact with water.

Among the nitrogen oxides ($NO_x$) as the above-mentioned impurities, nitrogen dioxide ($NO_2$) may be contacted with and dissolved in water into nitric acid ($HNO_3$) to become disunited. However, the exhaust gas from the coal-fired boiler has less oxygen ($O_2$) so that nitrogen exists substantially in the form of nitrogen monoxide (NO) which is water-insoluble and thus is unremovable by water spraying or the like.

The above-mentioned sulfuric acid, hydrochloric acid and nitric acid are known to have a problem that they may erode equipment in the exhaust gas treatment device; and hydrargyrum, which is trace metal, is known to hurt low-temperatured aluminum members constituting a heat exchanger. Thus, it is preferable that these impurities in the exhaust gas are removed at early stages. There is also a problem that admixture of the impurities into the exhaust gas lowers a degree of purity of the carbon dioxide, which requires increase in size of equipment for liquefying the carbon dioxide through compression and cooling and makes the liquefying work troublesome. Thus, in a coal-fired boiler for oxyfuel combustion or other system where an exhaust gas mainly composed of carbon dioxide is produced and the carbon dioxide produced is disposed, it is extremely important to remove impurities in the exhaust gas.

Thus, as shown in Patent Literature 1, it has been conducted in the coal-fired boiler or the like for oxyfuel combustion that a spray-column- or packed-column-type or other wet desulfurizer used in a conventional air-fired boiler or the like is provided to remove sulfur oxides. Moreover, nitrogen and nitrogen oxides derived from coal feedstock are produced in the exhaust gas from the coal-fired boiler for oxyfuel combustion or the like, so that it has been conducted that a catalyst-type or other denitrator is arranged upstream of the desulfurizer to remove the nitrogen and nitrogen oxides.

It is known in provision of the wet desulfurizer as mentioned in the above that sulfur oxides and hydrogen chloride as well as dust contained in the exhaust gas are removed and that nitrogen oxides are partly removed and hydrargyrum, which is inherently low in content, is slightly removed. It has been also conceived that if hydrargyrum in the exhaust gas is still high in concentration even after the above-mentioned exhaust gas treatment is conducted, a hydrargyrum-removing column is arranged to remove the hydrargyrum by adsorbent or the like.

CITATION LIST

Patent Literature

[Patent Literature 1] JP 2010-172878A

SUMMARY OF INVENTION

Technical Problems

However, the conventional exhaust gas treatment system has problems that equipment for removal of impurities in exhaust gas becomes extreme large in size, complicated in structure and increased in installation cost since impurities in the exhaust gas are removed by both a spray- or packed-column type or other wet desulfurizer and a catalyst-based or other denitrator, as shown in Patent Literature 1.

Thus, an exhaust gas treatment system has been demanded which can remove nitrogen oxides as impurities in exhaust gas at a low cost, using simple equipment.

The invention was made in view of the above and has its object to provide a compressor-based impurity removal system which can remove nitrogen oxides as impurities in exhaust gas from an oxyfuel combustor at a low cost, using simple equipment.

Solution to Problems

The invention is directed to a compressor-based impurity removal system for removing impurities in exhaust gas mainly composed of carbon dioxide from an oxyfuel combustor before the exhaust gas is supplied to a carbon dioxide liquefier, comprising a plurality of impurity separators comprising a plurality of compressors for compressing exhaust gas from the oxyfuel combustor stepwisely to a target pressure for supply of the exhaust gas to the carbon dioxide liquefier for liquefaction thereof, and aftercoolers for cooling the exhaust gas from the respective compressors, water condensed by the cooling being discharged as drain, an alkaline agent supply unit for supplying an alkaline agent to an upstream side of the aftercooler in a last one of the impurity separators, the drain containing the alkaline agent having removed the impurities in the exhaust gas being discharged from the aftercooler in the last impurity separator, and a circulation line for supplying the drain from the aftercooler in the last impurity separator to an upstream side of the aftercooler in a first one of the impurity separators.

Preferably, the compressor-based impurity removal system further comprises a drain tank for storing the drain from the aftercooler in the last impurity separator in a constant amount, a pH sensor for measuring a pH of the drain stored in said drain tank and a controller for outputting a supply quantity signal to said alkaline agent supply unit to control a supply quantity of the alkaline agent so as to keep the pH value detected by said pH sensor to a predetermined set value.

Preferably, the compressor-based impurity removal system further comprises a further drain tank for storing the drain from the aftercooler in the first impurity separator in a constant amount, a further pH sensor for measuring a pH of the drain stored in said further drain tank and a further controller for outputting a command signal to said controller to correct the supply quantity signal of said controller so as to keep a pH value detected by said further pH sensor to a predetermined corrective set value.

Preferably, the compressor-based impurity removal system further comprises an impurity sensor downstream of the aftercooler in the last impurity separator and said controller to which an impurity value detected by said impurity sensor is inputted, said controller issuing a command for increasing a supply of the alkaline agent by said alkaline agent supply unit when the impurity value detected by the impurity sensor exceeds a predetermined value.

Advantageous Effects of Invention

According to a compressor-based impurity removal system of the invention, an alkaline agent is supplied upstream of an aftercooler in a last one of impurity separators provided with a compressor and the aftercooler, so that impurities particularly comprising nitrogen oxides in exhaust gas are discharged together with drain containing the alkaline agent from the aftercooler in the last impurity separator. The drain from the aftercooler in the last impurity separator is supplied to at least an upstream side of an aftercooler in a first one of the impurity separators, so that the impurities comprising sulfur oxides in the exhaust gas are discharged together with drain from the aftercooler in the first impurity separator. Thus, impurities in the exhaust gas are effectively removed, using the compressors and the aftercoolers required for liquefaction of carbon dioxide. As a result, obtainable is an excellent effect that a desulfurizer and a denitrator can be downsized or eliminated to thereby substantially reduce an installation cost.

DESCRIPTION OF EMBODIMENTS

Embodiments of the invention will be described in conjunction with the attached drawings.

Figure 1:
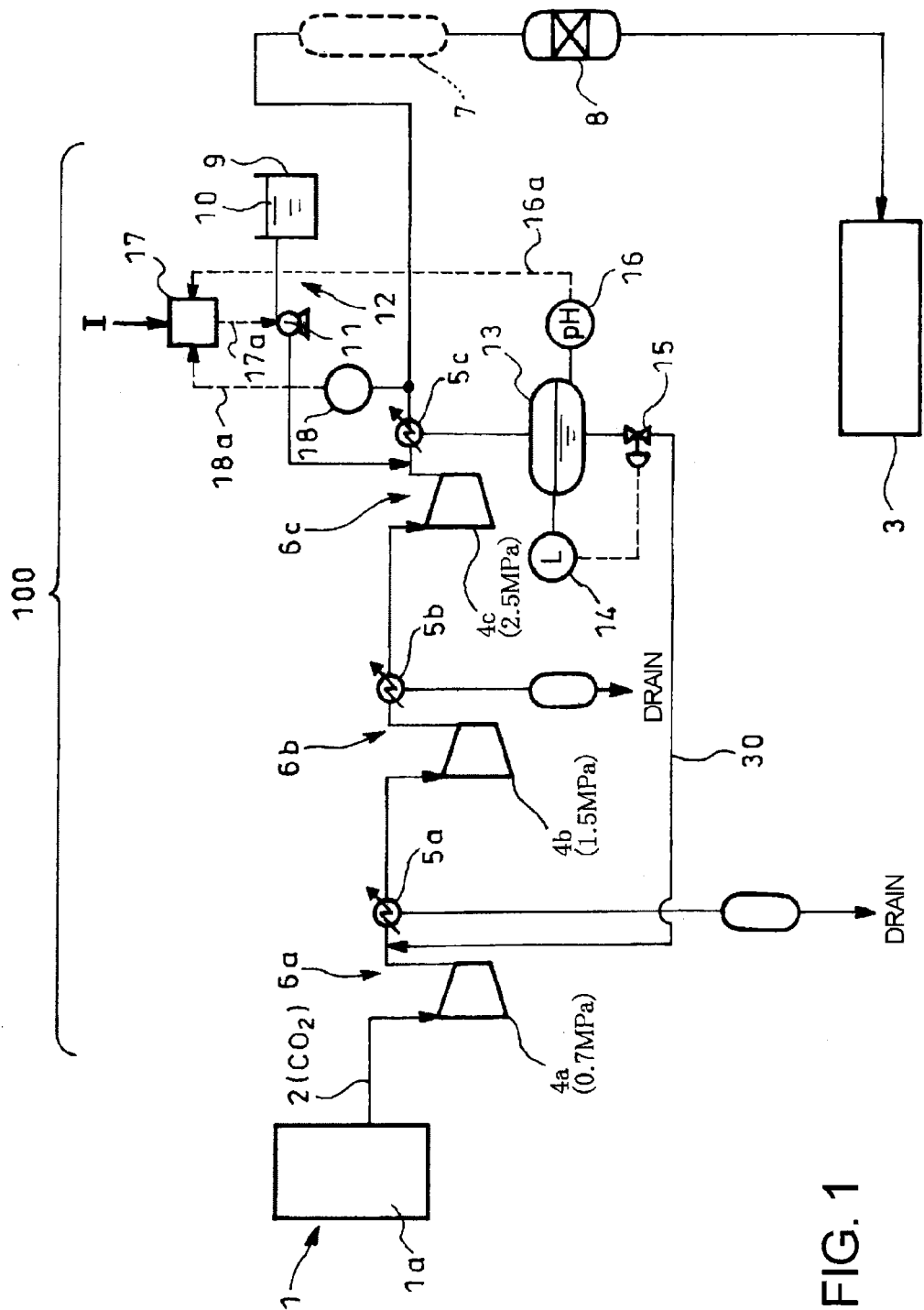
FIG. 1 is a systematic diagram showing an embodiment of a compressor-based impurity removal system according to the invention which is arranged for an oxyfuel combustor.

FIG. 1 is a systematic diagram showing an embodiment of a compressor-based impurity removal system 100 according to the invention which is arranged for an oxyfuel combustor. In FIG. 1, reference numeral 1 denotes the oxyfuel combustor comprising a coal-fired boiler 1a or the like for oxyfuel combustion of pulverized coal. Discharged from the oxyfuel combustor 1 is exhaust gas 2 mainly composed of carbon dioxide ($CO_2$). In order to supply such exhaust gas 2 mainly composed of carbon dioxide from the oxyfuel combustor 1 to a carbon dioxide liquefier 3 for liquefaction thereof, arranged upstream of the liquefier 3 is the compressor-based impurity removal system 100 adapted to compress the exhaust gas 2 up to a predetermined target pressure and remove impurities in the exhaust gas 2.

The compressor-based impurity removal system 100 shown in FIG. 1 comprises a plurality of (three in the embodiment illustrated) impurity separators 6a, 6b and 6c comprising a plurality of compressors 4a, 4b and 4c for compression of the exhaust gas 2 from the oxyfuel combustor 1 stepwisely up to the target pressure and aftercoolers 5a, 5b and 5c (coolers) for cooling of the exhaust gas 2 compressed in the respective compressors 4a, 4b and 4c to discharge water condensed by the cooling as drain. Generally, a cooler arranged between the compressors is called as intercooler; however, for ease of explanation, all of the coolers in the invention are explained as aftercoolers 5a, 5b and 5c.

Operations of the impurity separators 6a, 6b and 6c for liquefaction of carbon dioxide under various temperature and pressure conditions were studied to find out that a summed operational energy of the compressors and aftercoolers is lowest when carbon dioxide is increased in pressure up to 2.5 MPa and temperature is lowered to −30° C. prior to supply of the carbon dioxide to the carbon dioxide liquefier 3. Thus, 2.5 MPa is set as a target pressure. Here, 2.5 MPa set as the target pressure is a rough standard since temperatures and pressures set to the impurity separators 6a, 6b and 6c may vary depending on components, water content and carrying means (carrying vessel or the like) of the exhaust gas 2. Cooling below −40° C. requires an ammonia refrigerator since an alternative chlorofluorocarbon coolant in general is unusable at the temperature, which disadvantageously leads to increase in installation cost; thus, it is preferable that the cooling temperature by the aftercoolers 5 is set to on the order of −30° C.

Since the exhaust gas 2 cannot be pressurized up to the target pressure of 2.5 MPa all at once by a single compressor 4, the three compressors 4a, 4b and 4c are arranged according to the embodiment for three-step compressions into 0.75 MPa, 1.5 MPa and 2.5 MPa, thereby providing the impurity separators 6a, 6b and 6c. The number of the compressors 4a, 4b and 4c (the number of the impurity separators 6a, 6b and 6c) may be any including 4 or more.

In the first impurity separator 6a set to the above-mentioned pressure, almost all of the water in the exhaust gas 2 is discharged as drain; in the middle impurity separator 6b, a small amount of drain is discharged; and in the last impurity separator 6c, a further small amount of drain is discharged.

According to the compressor-based impurity removal system 100, impurities in the exhaust gas 2 are removed together with the drain. When a concentration of hydrargyrum (Hg) in the carbon dioxide having passed through the compressor-based impurity removal system 100 is higher than its target value, a hydrargyrum-removing column 7 is arranged downstream of the impurity removal system 100 to remove hydrargyrum, using an adsorbent or the like (the hydrargyrum-removing column 7 is shown in broken line in the drawings). Arranged upstream of the carbon dioxide liquefier 3 is a dryer 8 for removal of water in the carbon dioxide to be supplied to the carbon dioxide liquefier 3.

In the compressor-based impurity removal system 100 shown in FIG. 1, an alkaline agent supply unit 12 is arranged to supply an alkaline agent 10 in an alkaline agent tank 9 by a pump 11 to an entry (upstream) side of the aftercooler 5c in the last impurity separator 6c. The entry side of the last aftercooler 5c is most preferable as the supply position of the alkaline agent 10 by the alkaline agent supply unit 12 since the pressure in the last impurity separator 6c is highest. Alternatively, the alkaline agent may be supplied by the alkaline agent supply unit 12 to an entry side of the aftercooler 5b upstream of and adjacent to the last impurity separator 6c.

The alkaline agent 10 usable is sodium hydroxide (NaOH), magnesium hydrate or the like which is highly dispersible and which causes no fixation or the like. Alternatively, lime stone ($CaCO_3$), calcined lime (CaO), hydrated lime ($Ca(OH)_2$) or the like may be used when dispersibility can be maintained and a problem of fixation or the like can be solved.

Further, a drain tank 13 is arranged for storing a constant amount of drain from the aftercooler 5c in the last impurity separator 6c. The drain tank 13 is provided with a level controller 14 which controls an opening degree of a discharge valve 15 arranged on a drain discharge (downstream) side of the tank 13 so as to keep a detection value always constant.

The drain from the discharge valve 15 of the drain tank 13 is supplied through a circulation line 30 to an entry (upstream) side of the aftercooler 5a in the first impurity separator 6a. Here, the entry side of the aftercooler 5a means a position between the aftercooler 5a and the compressor 4a positioned upstream of the aftercooler 5a. Alternatively, the drain from the drain tank 13 through the circulation line 30 may be supplied on an entry (upstream) side of the aftercooler 5b downstream of and adjacent to the first impurity separator 6a.

The drain tank 13 is further provided with a pH sensor 16 for measurement of a pH in the drain stored, and a pH value 16a detected by the pH sensor 16 is inputted to a controller 17 which outputs a supply quantity signal 17a to the alkaline agent supply unit 12 to control a supply quantity of the alkaline agent 10 so as to keep the pH value 16a detected by the sensor 16 to a predetermined set value I.

Arranged on an exit (downstream) side of the aftercooler 5c in the last impurity separator 6c where the exhaust gas 2 is discharged is an impurity sensor 18 for detection of impurities (e.g., nitrogen oxides) in the exhaust gas 2, and an impurity value 18a detected by the impurity sensor 18 is inputted to the controller 17 which in turn conducts an emergency control to output a supply quantity signal 17a (increase command) for increase of a supply of the alkaline agent 10 by the alkaline agent supply unit 12 when the impurity (e.g. nitrogen oxides) value 18a detected by the impurity sensor 18 exceeds a predetermined value. The exit side of the aftercooler 5c is most preferable as a position of the impurity sensor 18 for quick detection of the impurities in the drain; alternatively, it may be arranged at any position downstream of the aftercooler 5c and between the aftercooler 5c and the dryer 8 (or the hydrargyrum-removing column 7).

The compressor 4a in the first impurity separator 6a, which is supplied with the exhaust gas 2 containing impurities from the oxyfuel combustor 1 and thus has a concern of being corroded, is preferably made of an anticorrosive material such as HASTELLOY (registered trademark). Here, the anticorrosive material is not restricted to heat-resistive nickel alloys, but may be constituted by any other metal, alloy or inorganic substance provided that the material has corrosion- and heat-resistance. Moreover, the compressor 4a may be a compressor with blades (vanes), or a gear-driven turbocharger-based compressor with no blades.

Next, mode of operation of the above embodiment will be described.

The exhaust gas 2 mainly composed of carbon dioxide from the oxyfuel combustor 1 in FIG. 1 is guided with a pressure of, for example, 0.1 MPa (one atmosphere of pressure) to the compressor 4a in the first impurity separator 6a in the impurity removal system 100, and is pressurized by the compressor 4a to 0.7 MPa. The exhaust gas 2 pressurized by the compressor 4a to 0.7 MPa is supplied, together with the drain from the drain tank 13 through the circulation line 30, to and cooled by the adjacent aftercooler 5a from which drain is discharged in large quantity.

The exhaust gas 2 cooled by the aftercooler 5a is guided to and pressurized by the compressor 4b in the downstream (succeeding) impurity separator 6b to 1.5 MPa. The exhaust gas 2 pressurized to 1.5 MPa is cooled by the adjacent aftercooler 5b from which drain is discharged in a smaller amount than that from the aftercooler 5a.

The exhaust gas 2 cooled by the aftercooler 5b is guided to and pressurized by the compressor 4c in the last impurity separator 6c to 2.5 MPa. The exhaust gas 2 pressurized by the compressor 4c to 2.5 MPa is supplied, together with the alkaline agent 10 from the alkaline agent supply unit 12, to and cooled by the adjacent aftercooler 5c from which the drain containing the alkaline agent 10 is discharged to be supplied to the drain tank 13.

The exhaust gas 2 guided to the aftercooler 5c in the last impurity separator 6c has been pressurized stepwisely by the compressors 4a, 4b and 4c up to 2.5 MPa, so that nitrogen oxide (NO) in the exhaust gas 2 is changed into water-soluble nitrogen oxides ($NO_2$) owing to accelerated oxidization through the pressurization. Further, the alkaline agent 10 is supplied upstream of the aftercooler 5c in the last impurity separator 6c to keep the pH value high, so that dissolving of the nitrogen oxides into the drain is enhanced and thus the nitrogen oxides are removed with high removal efficiency.

The drain discharged to the drain tank 13, which has unreacted alkaline agent 10, is supplied through the circulation line 30 to an upstream side of the aftercooler 5a in the first impurity separator 6a. Then, sulfur oxides and hydrogen chloride which are water-soluble impurities in the exhaust gas 2 to be supplied to the aftercooler 5a are effectively removed by the unreacted alkaline agent 10 supplied upstream of the aftercooler 5a by the circulation line 30. Specifically, the sulfur oxides and hydrogen chloride which are water-soluble impurities are removed with a relatively high removal efficiency with the drain discharged in large quantity from the first impurity separator 6a. In this connection, the drain containing the unreacted alkaline agent 10 is supplied upstream of the aftercooler 5a in the first impurity separator 6a through the circulation line 30 as mentioned in the above so that the removal efficiency of sulfur oxides and hydrogen chloride is further enhanced. The drain containing the impurities is supplied to a wastewater treatment device (not shown) for disposal.

As mentioned in the above, carbon dioxide made free from impurities in the exhaust gas 2 by the compressor-based impurity removal system 100 is further made free from hydrargyrum by the hydrargyrum-removing column 7 as needs demand, is supplied to the dryer 8 for removal of water and then is supplied to and liquefied through cooling by the carbon dioxide liquefier 3.

Figure 2:
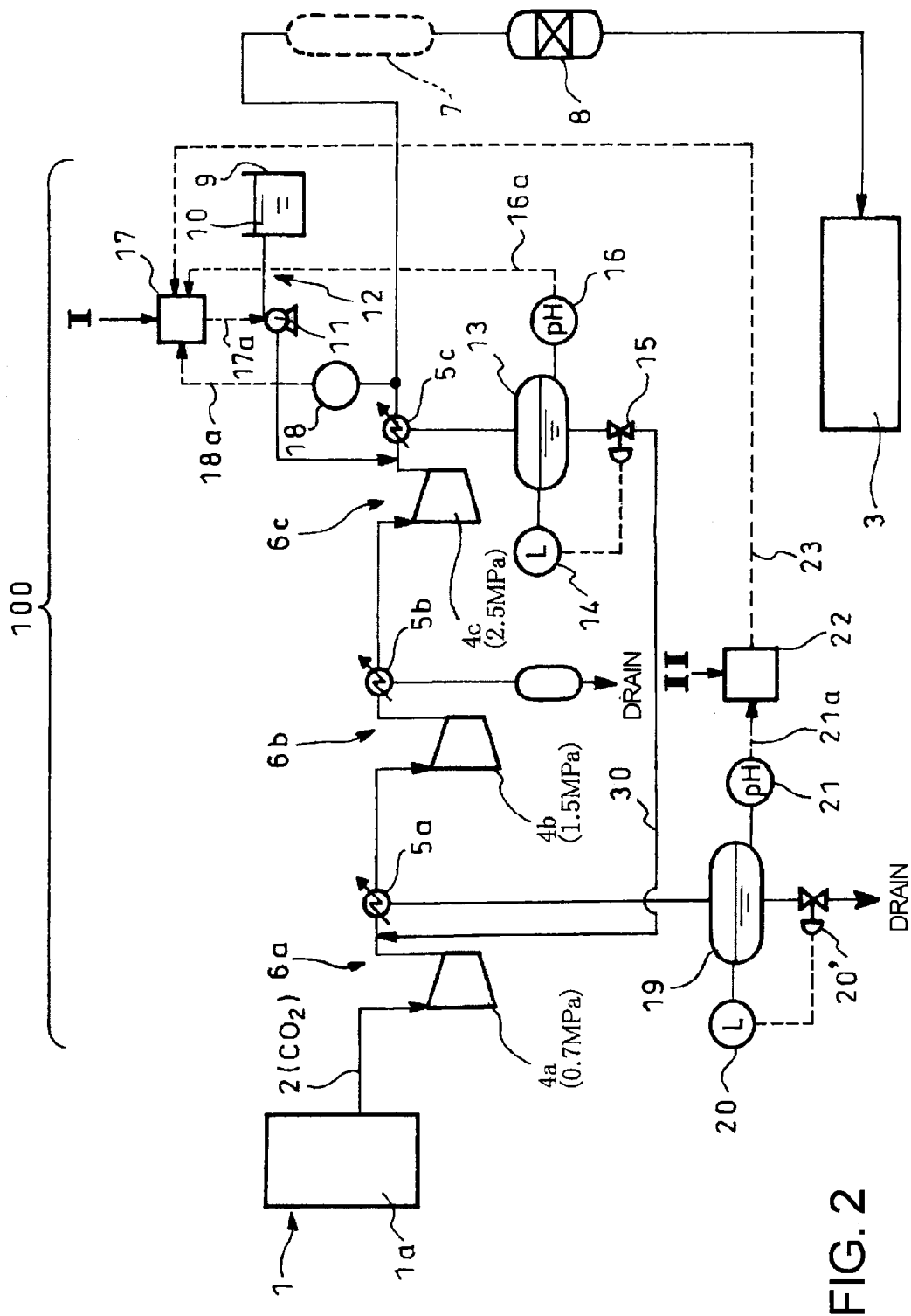
FIG. 2 is a systematic diagram showing a further embodiment of the compressor-based purity removal system according to the invention.

FIG. 2 is a systematic diagram showing a further embodiment of the compressor-based impurity removal system in the invention. In this embodiment, a further drain tank 19 is provided for the aftercooler 5a in the first impurity separator 6a so as to store the drain from the aftercooler 5a in a constant amount. The further drain tank 19 is provided with a level controller 20 which controls an opening degree of a discharge valve 20' arranged on an exit (downstream) side of the further drain tank 19 so as to maintain a detected value always constant.

The further drain tank 19 is further provided with a further pH sensor 21 for measurement of a pH in the stored drain, and a pH value 21a detected by the further pH sensor 21 is inputted to a further controller 22. The further controller 22 outputs a command signal 23 to the controller 17 to correct the supply quantity signal 17a of the controller 17 so as to keep the pH value 21a detected by the further pH sensor 21 to a predetermined corrective set value II. Here, the pH of the drain in the drain tank 13 may be set approximately within a range of 4-6.

According to the FIG. 2 embodiment, the command signal 23 is outputted from the further controller 22 to the controller 17 to correct the supply quantity signal 17a of the controller 17 so as to keep the detected pH value 21a of the drain in the further drain tank 19 to the corrective set value II result; as a result, a concentration of the alkaline agent 10 in the drain discharged to the further drain tank 19 is kept proper. Thus, substantially enhanced is removal efficiency of impurities and especially of sulfur oxides and hydrogen chloride by the first impurity separator 6a.

Figure 3:
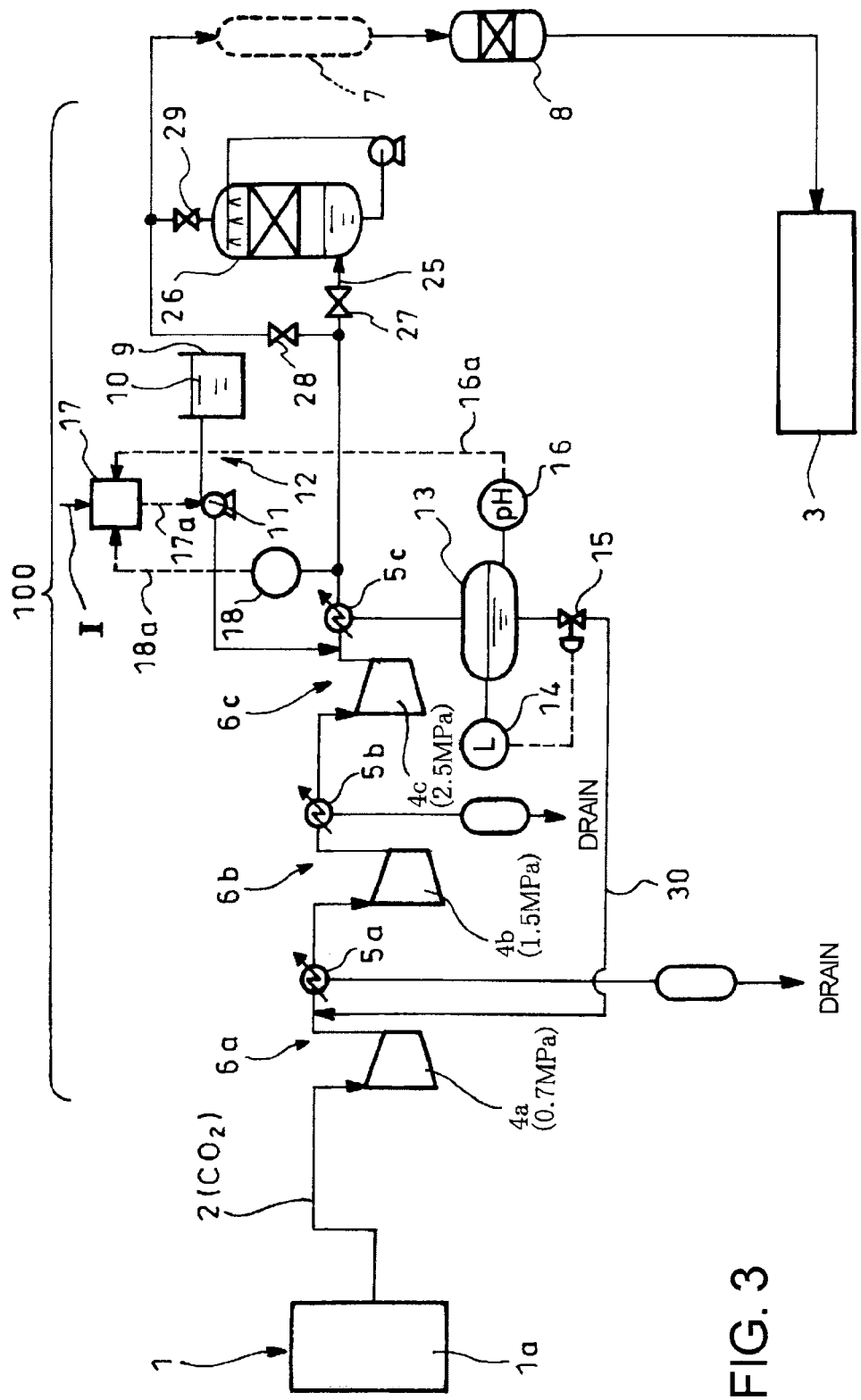
FIG. 3 is a systematic diagram showing a modification of the embodiment of the compressor-based impurity removal system according to the invention.

FIG. 3 is a systematic diagram showing a modification of the compressor-based impurities removal system according to the invention. In FIG. 3 modification, a bypass duct 25 is arranged downstream of the last impurity separator 6c and thus downstream in the compressor-based impurity removal system 100. The bypass duct 25 is provided with a wet desulfurization and denitration device 26 and further with changeover valves 27, 28 and 29 for changeover between flowing and non-flowing states of the exhaust gas 2 to the desulfurization and denitration device 26.

With the bypass duct 25 being provided with the desulfurization and denitration device 26, the exhaust gas 2 may be supplied to the desulfurization and denitration device 26 as needs demand, whereby impurities in the exhaust gas may be further reduced when the need arises. In this case, the amount (volume) of the exhaust gas 2 guided to the desulfurization and denitration device 26 is extremely trifle because of compression by the compressor-based impurity removal system 100, so that the desulfurization and denitration device 26 used may be extremely small-sized (reduced in size to about one-several tenths in comparison with a conventional device).

As mentioned in the above, in the compressor-based impurity removal system 100 according to the invention, the alkaline agent supply unit 12 is provided to supply the alkaline agent to an upstream side of the aftercooler 5c in the last impurity separator 6c to thereby discharge the drain containing the alkaline agent having removed impurities in the exhaust gas from the aftercooler 5c in the last impurity separator 6c. Further, the circulation line 30 is provided to supply the drain discharged from the aftercooler 5c in the last impurity separator 6c to the upstream side of the aftercooler 5a in the first impurity separator 6a. As a result, impurities in the exhaust gas 2 can be effectively removed with a lower cost, using simple equipment.

Specifically, nitrogen oxide (NO) in the exhaust gas 2 has been changed into water-soluble nitrogen oxides ($NO_2$) in the last impurity separator 6c where the pressure is highest, so that supplying of the alkaline agent 10 to the upstream side of the aftercooler 5c for cooling of the high-pressured exhaust gas 2 containing nitrogen oxides enhances the pH of the drain and thus the dissolving of the nitrogen oxides into the drain, whereby the nitrogen oxides are removed with high removing efficiency.

Moreover, the drain from the drain tank 13 is supplied upstream of the aftercooler 5a in the first impurity separator 6a through the circulation line 30, so that sulfur oxides and hydrogen chloride which are water-soluble impurities in the exhaust gas 2 supplied to the aftercooler 5a can be effectively removed, using the unreacted alkaline agent 10 contained in the drain.

As mentioned in the above, in the compressor-based impurity removal system 100 of the invention, impurities in the exhaust gas 2 can be effectively removed, using the compressors 4 and aftercoolers 5 necessary for liquefaction of the carbon dioxide. As a result, downsizing or elimination of a desulfurizer and a denitrator can be attained to substantially reduce installation cost.

In the compressor-based impurity removal system 100 according to the invention, providable are the drain tank 13 for storing of the drain from aftercooler 5c in the last impurity separator 6c, the pH sensor 16 for measurement of the pH in the drain stored in the drain tank 13 and the controller 17 for control of the supply quantity of the alkaline agent 10 by the alkaline agent supply unit 12 on the basis of the pH value 16a detected by the pH sensor 16. Then, the supply of the alkaline agent 10 is properly controlled to remove impurities in the exhaust gas 2 further effectively. And, the amount of the alkaline agent 10 used is properly controlled to suppress cost for the alkaline agent.

The compressor-based impurity removal system 100 according to the invention may further comprise the further drain tank 19 for storing of the drain from the aftercooler 5a in the first impurity separator 6a in a certain amount, the further pH sensor 21 for measurement of the pH in the drain stored in the further drain tank 19 and the further controller 22 for output of the command signal 23 to the controller 17 to correct the supply quantity signal 17a of the controller 17 such that the pH value 21a detected by the further pH sensor 21 is kept to the predetermined corrective set value II. Then, the concentration of the alkaline agent 10 in the drain of the drain tank 19 is kept in a proper condition, so that removal of impurities and specifically of sulfur oxides and hydrogen chloride by the first impurity separator 6a is substantially enhanced.

The compressor-based impurity removal system 100 according to the invention further comprises the impurity sensor 18 arranged downstream of the aftercooler 5c in the last impurity separator 6c and the controller 17 to which impurity value 18a detected by the impurity sensor 18 is inputted. The controller 17 issues the command to increase the supply of the alkaline agent 10 by the alkaline agent supply unit 12 when the impurity value 18a detected by the impurity sensor exceeds a predetermined value. Thus, the impurities in the exhaust gas 2 passed through the compressor-based impurity removal system 100 can be prevented from being abruptly increased.

It is to be understood that a compressor-based impurity removal system according to the invention is not limited to the above embodiments and that various changes and modifications may be made without departing from the scope of the invention.

INDUSTRIAL APPLICABILITY

A compressor-based impurity removal system according to the invention is applicable to removal of impurities in exhaust gas mainly composed of carbon dioxide from an oxyfuel combustor, using impurity separators comprising compressors and aftercoolers, prior to supplying of the exhaust gas to a carbon dioxide liquefier.

REFERENCE SIGNS LIST 1 oxyfuel combustor
2 exhaust gas 3 carbon dioxide liquefier
4 compressor
4a, 4b and 4c compressor
5 aftercooler
5a, 5b and 5c aftercooler
6a, 6b and 6c impurity separator
9 alkaline agent tank
10 alkaline agent
12 alkaline agent supply unit
13 drain tank
16 pH sensor
16a pH value detected
17 controller
17a supply quantity signal
18 impurity sensor
18a impurity value detected
19 further drain tank
21 further pH sensor
21a pH value detected
22 further controller
23 command signal
30 circulation line
I set value
II corrective set value

The invention claimed is:

1. A compressor-based impurity removal system for removing impurities in exhaust gas mainly composed of carbon dioxide from an oxyfuel combustor before the exhaust gas is supplied to a carbon dioxide liquefier, comprising
a plurality of impurity separators comprising a plurality of compressors for compressing exhaust gas from the oxyfuel combustor stepwisely to a target pressure for supply of the exhaust gas to the carbon dioxide liquefier for liquefaction thereof, and aftercoolers for cooling the exhaust gas from the respective compressors, water condensed by the cooling being discharged as drain,
an alkaline agent supply unit for supplying an alkaline agent to an upstream side of the aftercooler in a last one of the impurity separators, the drain containing the alkaline agent having removed the impurities in the exhaust gas being discharged from the aftercooler in the last impurity separator, and
a circulation line for supplying the drain from the aftercooler in the last impurity separator to an upstream side of the aftercooler in a first one of the impurity separators.

2. The compressor-based impurity removal system as claimed in claim 1 further comprising a drain tank for storing the drain from the aftercooler in the last impurity separator in a constant amount, a pH sensor for measuring a pH of the drain stored in said drain tank and a controller for outputting a supply quantity signal to said alkaline agent supply unit to control a supply quantity of the alkaline agent so as to keep the pH value detected by said pH sensor to a predetermined set value.

3. The compressor-based impurity removal system as claimed in claim 2 further comprising an impurity sensor downstream of the aftercooler in the last impurity separator and said controller to which an impurity value detected by said impurity sensor is inputted, said controller issuing a command for increasing a supply of the alkaline agent by said alkaline agent supply unit when the impurity value detected by the impurity sensor exceeds a predetermined value.

4. The compressor-based impurity removal system as claimed in claim 2, further comprising a further drain tank for storing the drain from the aftercooler in the first impurity separator in a constant amount, a further pH sensor for measuring a pH of the drain stored in said further drain tank and a further controller for outputting a command signal to said controller to correct the supply quantity signal of said controller so as to keep a pH value detected by said further pH sensor to a predetermined corrective set value.

5. The compressor-based impurity removal system as claimed in claim 4 further comprising an impurity sensor downstream of the aftercooler in the last impurity separator and said controller to which an impurity value detected by said impurity sensor is inputted, said controller issuing a command for increasing a supply of the alkaline agent by said alkaline agent supply unit when the impurity value detected by the impurity sensor exceeds a predetermined value.

* * * * *